(12) United States Patent
Hayes et al.

(10) Patent No.: US 8,533,014 B1
(45) Date of Patent: Sep. 10, 2013

(54) SYSTEM AND METHOD PROVIDING LEVELNESS OF A PRODUCTION SCHEDULE

(75) Inventors: Timothy Reed Hayes, McKinney, TX (US); Aamer Rehman, Flower Mound, TX (US); Dale Jay Raar, West Olive, MI (US); Jonathan Bier, Ashland, MA (US); George Edward Barton, Jr., Somerville, MA (US)

(73) Assignee: JDA Software Group, Inc., Scottsdale, AZ (US)

( * ) Notice: Subject to any disclaimer, the term of this patent is extended or adjusted under 35 U.S.C. 154(b) by 526 days.

(21) Appl. No.: 12/774,202

(22) Filed: May 5, 2010

Related U.S. Application Data

(60) Provisional application No. 61/175,989, filed on May 6, 2009.

(51) Int. Cl.
*G06Q 10/00* (2012.01)

(52) U.S. Cl.
USPC ........... 705/7; 705/8; 705/10; 705/22; 705/28

(58) Field of Classification Search
USPC ....................................... 705/7, 8, 10, 22, 28
See application file for complete search history.

(56) References Cited

U.S. PATENT DOCUMENTS

| 5,615,109 A | * | 3/1997 | Eder | 705/7.12 |
| 5,819,232 A | * | 10/1998 | Shipman | 705/7.24 |
| 2004/0193500 A1 | * | 9/2004 | Brown et al. | 705/22 |
| 2008/0097831 A1 | * | 4/2008 | Cihla et al. | 705/10 |

\* cited by examiner

*Primary Examiner* — Nga B. Nguyen
(74) *Attorney, Agent, or Firm* — Jackson White, PC; Steven J. Laureanti

(57) ABSTRACT

A system and method is disclosed for providing levelness of a production schedule. The system includes a computer configured to access demand data of one or more items to be processed within a sequence of tasks, access the demand data of the one or more items, calculate one or more time intervals for each of the one or more items, and calculate a weighted average for each of the one or more items. The computer is further configured to calculate a time ratio according to the sequence of tasks by calculating the average of the calculated time intervals and the calculated weighted averages and calculating a minimum ratio of an adjusted time interval for each of the one or more items and the calculated weighted averages. The computer is still further configured to generate a production schedule based on a sequence of tasks having a predetermined calculated time ratio.

21 Claims, 3 Drawing Sheets

SYSTEM AND METHOD PROVIDING LEVELNESS OF A PRODUCTION SCHEDULE

CROSS-REFERENCE TO RELATED APPLICATIONS

The present invention is related to that disclosed in U.S. Provisional Patent Application Ser. No. 61/175,989, filed 6 May 2009, entitled "System and Method for Providing Levelness." U.S. Provisional Patent Application Ser. No. 61/175,989 is assigned to the assignee of the present application. The subject matter disclosed in U.S. Provisional Patent Application Ser. No. 61/175,989 is hereby incorporated by reference into the present disclosure as if fully set forth herein. The present invention hereby claims priority under 35 U.S.C. §119(e) to U.S. Provisional Patent Application Ser. No. 61/175,989.

TECHNICAL FIELD OF THE INVENTION

This invention relates generally to production scheduling, and more particularly to a system and method for providing levelness of a production schedule.

BACKGROUND OF THE INVENTION

In lean manufacturing environments, one of the objectives is to spread out all tasks in a schedule to produce a type of level pattern that stabilizes the requirements on upstream suppliers and processes. However, in traditional lean manufacturing environments, there is currently no mechanism to measure the quality of the levelness of the production schedule. The inability to measure the levelness of a production schedule is undesirable.

SUMMARY OF THE INVENTION

A system providing levelness of a production schedule is disclosed. The system includes a database that stores demand data of one or more items to be processed within a sequence of tasks. The system further includes a computer coupled with the database and configured to access demand data of one or more items to be processed within a sequence of tasks, access the demand data of the one or more items, calculate one or more time intervals for each of the one or more items, and calculate a weighted average for each of the one or more items. The computer is further configured to calculate a time ratio according to the sequence of tasks by calculating the average of the calculated time intervals and the calculated weighted averages and calculating a minimum ratio of an adjusted time interval for each of the one or more items and the calculated weighted averages. The computer is still further configured to generate a production schedule that has a high degree of levelness for the given product mix and store the generated production schedule in the database.

A method of providing levelness of a production schedule is also disclosed. The method provides for accessing demand data of one or more items to be processed within a sequence of tasks, calculating one or more time intervals for each of the one or more items, and calculating a weighted average for each of the one or more items. The method further provides for calculating a time ratio according to the sequence of tasks by calculating the average of the calculated time intervals and the calculated weighted averages and calculating a minimum ratio of an adjusted time interval for each of the one or more items and the calculated weighted averages. The method still further provides for generating a production schedule that has a high degree of levelness for the given product mix and storing the generated production schedule in the database.

A computer-readable medium embodied with software providing levelness of a production schedule is also disclosed. The software when executed using one or more computers is configured to access demand data of one or more items to be processed within a sequence of tasks, calculate one or more time intervals for each of the one or more items, and calculate a weighted average for each of the one or more items. The software is further configured to calculate a time ratio according to the sequence of tasks by calculating the average of the calculated time intervals and the calculated weighted averages and calculating a minimum ratio of an adjusted time interval for each of the one or more items and the calculated weighted averages. The software is still further configured to generate a production schedule that has a high degree of levelness for the given product mix and store the generated production schedule in the database

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
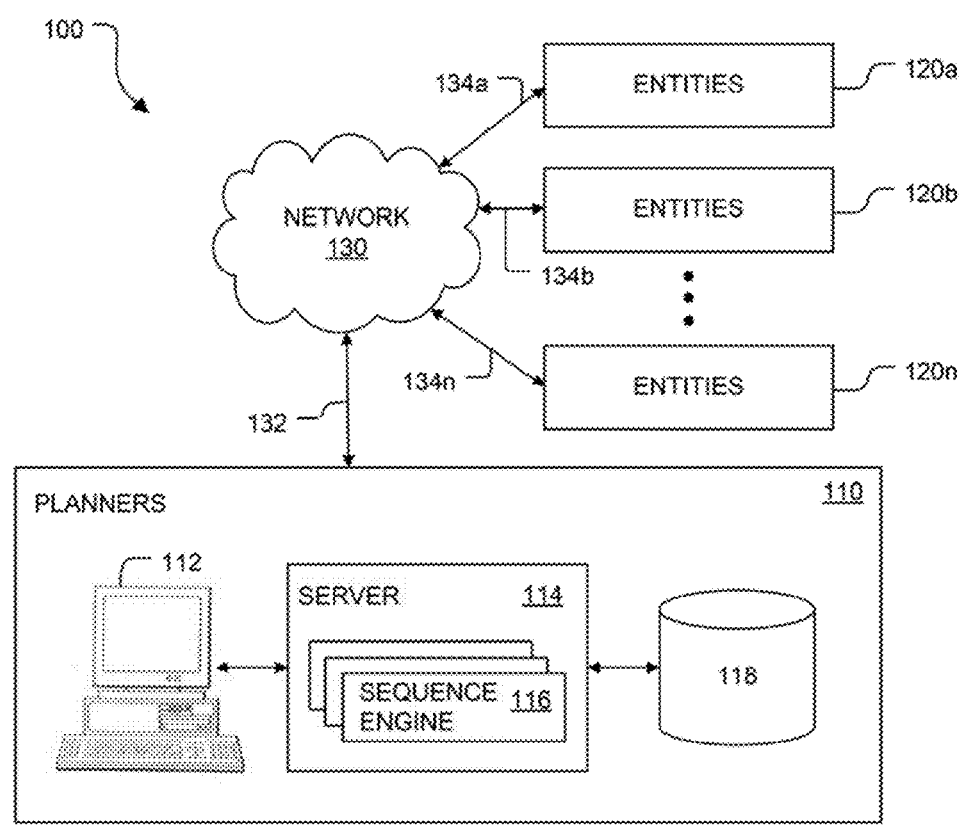
FIG. 1 illustrates an exemplary system according to a preferred embodiment.

FIG. 1 illustrates an exemplary system 100 according to a preferred embodiment. System 100 comprises one or more planners 110, one or more entities 120a-120n, a network 130, and communication links 132 and 134a-134n. Although one or more planners 110, one or more entities 120a-120n, and a single network 130, are shown and described; embodiments contemplate any number of planners 110, any number of entities 120a-120n, and/or any number of networks 130, according to particular needs. In addition, or as an alternative, one or more planners 110 may be integral to or separate from the hardware and/or software of any one of the one or more entities 120a-120n.

In one embodiment, one or more entities 120a-120n represent a supply chain network including one or more supply chain entities, such as, for example suppliers, manufacturers, distribution centers, retailers, and/or customers. A supplier may be any suitable entity that offers to sell or otherwise provides one or more parts (i.e., materials, components, or goods) to one or more other supply chain entities. A manufacturer may be any suitable entity that manufactures at least one item. A manufacturer may use one or more parts, from one or more upstream suppliers, during the manufacturing process to produce one or more items. A manufacturer may generate a production schedule (i.e., a set of ordered tasks) in order to produce the one or more items. A sequence of tasks is a contiguous set of tasks that repeats throughout a production schedule at a manufacturer in producing the one or more items.

In addition, or as an alternative, a subsequence of tasks is a contiguous set of tasks that starts with a particular item and only contains one element of that item. That is, the subsequence is a contiguous set of tasks within a sequence of tasks that starts with a particular item and contains only one task of that particular item and is followed by that particular item in the next subsequence, if applicable. In addition, the subsequence may go beyond the end of the sequence of tasks by assuming that the sequence repeats A manufacturer may, for example, produce and sell items to a supplier, another manufacturer, a distribution center, a retailer, a customer, or any other suitable person or entity. A distribution center may be any suitable entity that offers to sell or otherwise distributes at least one item to one or more retailers and/or customers. A retailer may be any suitable entity that obtains one or more items to sell to one or more customers.

Although one or more entities 120a-120n is shown and described as separate and distinct entities, the same person or entity can simultaneously act as any one of the one or more entities 120a-120n. For example, one or more entities 120a-120n acting as a manufacturer could produce an item, and the same entity could act as a supplier to supply an item to another supply chain entity. Although one example of a supply chain network is shown and described, embodiments contemplate any operational environment and/or supply chain network, without departing from the scope of the present invention.

In one embodiment, one or more planners 110 comprise one or more computers 112, one or more servers 114, and one or more databases 118. In addition, or as an alternative, one or more planners 110 and/or one or more entities 120a-120n may each operate on one or more computer systems including one or more computers 112 that are integral to or separate from the hardware and/or software that support system 100. These one or more computer systems may include any suitable input device, such as a keypad, mouse, touch screen, microphone, or other device to input information. These one or more computer systems may also include any suitable output device to convey information associated with the operation of one or more planners 110 and one or more entities 120a-120n, including digital or analog data, visual information, or audio information. These one or more computer systems may include fixed or removable computer storage media, such as magnetic computer disks, CD-ROM, or other suitable computer-readable storage media to receive output from and provide input to system 100. These one or more computer systems may include one or more processors and associated memory to execute instructions and manipulate information according to the operation of system 100. Each of these one or more computer systems may be a work station, personal computer (PC), network computer, notebook computer, personal digital assistant (PDA), cell phone, wireless device, telephone, wireless data port, or any other suitable computing device.

In one embodiment, the memory associated with these one or more computer systems comprises any of a variety of data structures, arrangements, and/or compilations configured to store and facilitate retrieval of information. The memory may, for example, comprise one or more volatile or non-volatile memory devices. Although the memory is described as residing within these one or more computer systems, the memory may reside in any location or locations that are accessible by one or more computers 112 or the one or more processors. The memory receives and stores information related to the levelness of one or more production schedules involving multiple items associated with, for example, one or more entities 120a-120n. The one or more processors processes information stored in the memory and accesses data representing the demand of items to be processed within an ordered set of tasks and provides the levelness of and generating of production schedules for the sequence of tasks associated with one or more entities 120a-120n. The memory stores and the one or more processors process any suitable information to perform one or more production scheduling operations associated with one or more entities 120a-120n.

In an embodiment, one or more servers 110 comprise one or more sequence engines 116. Although one or more servers 114 is shown and described as comprising one or more sequence engines 116, embodiments contemplate any suitable engines, solvers, or combination of engines and/or solvers, according to particular needs. One or more databases 118 comprises one or more databases or other data storage arrangements at one or more locations, local to, or remote from, one or more servers 114. One or more databases 220 may be coupled with one or more servers 114 using one or more local area networks (LANs), metropolitan area networks (MANs), wide area networks (WANs), network 130, such as, for example, the Internet, or any other appropriate wire line, wireless, or other links.

One or more databases 118 stores data to be used by one or more servers 114. One or more databases 118 may include data representing the demand of items to be processed within an ordered set of tasks, levelness of a production schedule, and one or more rules associated with one or more entities 120a-120n. In one embodiment, the data representing the levelness of a production schedule may be used by one or more sequence engines 116 to measure and optimize the levelness of a production schedule associated with one or more entities 120a-120n. In addition, or as an alternative, one or more sequence engines 116 uses the data representing the levelness as an objective function of a sequence of tasks, for example, in order to maximize profit, minimize cost, or the like. In another embodiment, these one or more rules may be used by one or more sequence engines 116 to minimize constraints, business rules, and penalties associated with one or more entities 120a-120n.

In an embodiment, one or more users are associated with one or more planners 110 and/or one or more entities 120a-120n. These one or more users include, for example, a "production planner" handling management and planning of the sequences of tasks, levelness of the production schedules and/or one or more related operations within system 100. In one embodiment, these one or more related operations include accessing data representing the demand of items to be processed, measuring the levelness of and generating production schedules for the sequence of tasks. In addition, or as an alternative, these one or more production planners within system 100 includes, for example, one or more computer systems programmed to autonomously handle planning and/or one or more related operations within system 100. As discussed above, one or more servers 114 may support one or more sequence engines 116, including one or more planning engines, which store, retrieve, measure, and generate production schedules based on inputs received from one or more entities 120a-120n, one or more production planners and/or one or more databases 118, as described more fully herein.

In one embodiment, one or more planners 110 is coupled with network 130 using communications link 132, which may be any wireline, wireless, or other link suitable to support data communications between one or more planners 110 and network 130 during operation of system 100. One or more entities 120a-120n are coupled with network 130 using communications links 134a-134n, which may be any wireline, wireless, or other link suitable to support data communications between one or more entities 120a-120n and network 130 during operation of system 100. Although communication links 132 and 134a-134n are shown as generally coupling one or more planners 110 and one or more entities 120a-120n to network 130, one or more planners 110 and one or more entities 120a-120n may communicate directly with each other, according to particular needs.

In addition, or as an alternative, network 130 includes the Internet and any appropriate local area networks (LANs), metropolitan area networks (MANS), or wide area networks (WANs) coupling one or more planners 110 and one or more entities 120a-120n. For example, data may be maintained by one or more planners 110 at one or more locations external to one or more planners 110 and one or more entities 120a-120n and made available to one or more associated users of one or more entities 120a-120n using network 130 or in any other appropriate manner. Those skilled in the art will recognize that the complete structure and operation of communication network 130 and other components within system 100 are not depicted or described. Embodiments may be employed in conjunction with known communications networks and other components.

Figure 2:
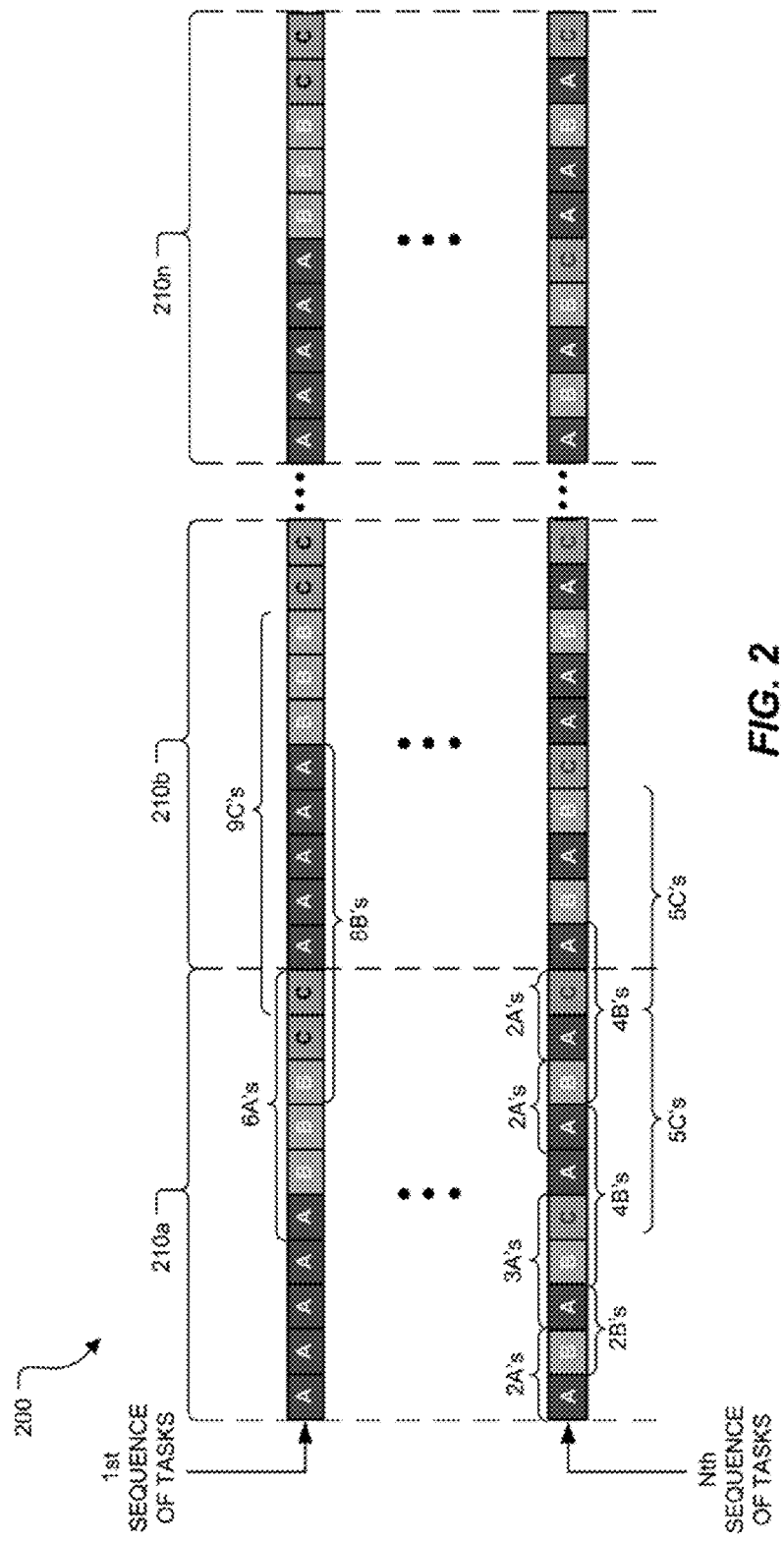
FIG. 2 illustrates an exemplary sequence of tasks in accordance with the preferred embodiment.

FIG. 2 illustrates an exemplary production schedule 200 in accordance with the preferred embodiment. As discussed above, a production schedule at one or more entities 120a-120n includes a sequence of tasks that represents a contiguous set of tasks that repeats throughout the production schedule in producing items. In addition, a task is an instance of producing an item at one or more entities 120a-120n. In this exemplary embodiment, sequence of tasks 210a-210n represents a contiguous set of tasks that repeats throughout production schedule 200 in producing items A, B, and C. As an example only, and not by way of limitation, sequence of tasks 210a represents a total demand of ten tasks at one or more entities 120a-120n, which is repeated throughout production schedule 200 for producing items A, B, and C. More specifically, sequence of tasks 210a represents a demand of five tasks for producing item A, three tasks for producing item B and two tasks for producing item C. Although an exemplary sequence of tasks 210a is shown and described comprising particular items and a particular demand associated with each item, embodiments contemplate any suitable number of items, any suitable demand, or any combination of items and/or demand, according to particular needs.

In one embodiment, one or more planners 110 optimizes production schedule 200 to a state of levelness by, for example, spreading out the tasks in sequence of tasks 210a, such that, the duration of the maximum interval between two production runs of the same item decreases. That is, one or more planners 110 optimizes the levelness of sequence of tasks 210a, by calculating a Takt time ratio TTR, discussed in more detail below, and adjusting the order of the tasks in sequence of tasks 210a by spreading the tasks associated with each item until a level sequence of tasks is achieved.

In addition, the Takt time ratio TTR provides one or more planners 110 with a consistent levelness indicator (i.e., fixed indicator between 0 and 10). For example, an indicator between 0 and 9 generally indicates a correctable unlevelness, an indicator between 9 and 10 generally indicates a possible mix of tasks conflict constraining levelness, and an indicator equal to 10 essentially indicates perfect levelness. In one embodiment, perfect levelness is achievable whenever the mix of tasks does not constrain and/or hinder the levelness of any item, such as, for example, when only two item types are mixed, or when the mix of tasks is evenly proportioned among any number of item types. In addition, embodiments provide compensation for simple sequences in which a maximum sequence is less than 9 and/or certain unlevel sequences which yield a Takt time ratio TTR greater than 9, such as by using one or more rules stored in database 118.

In one embodiment, one or more planners 110 determines the levelness of sequence of tasks 210a by calculating a Takt Time Ratio (TTR) using Equation (1):

$$TTR = TTR_1 + [TTR_2] \qquad (1)$$
$TTR_1$ = Average of $T_A/M_A$ for all items A
$T_A = D/D_A$     Takt Time Interval
  D = Demand:     number of tasks in sequence
  $D_A$ = Demand of type A:     number of type A tasks in sequence
  $M_A$ = Weighted Average of the number of tasks in A subsequences having $\geq [T_A]$ tasks.
    Note number of tasks in each A subsequence having $X \geq [T_A]$ tasks
    Count each sequence duration $1 + [|T_A - X|]$ times.
$TTR_2 = \text{Min}(1, T'_A/M_A)$ for all items A
$T'_A = [T_A + 1]$     Adjusted Takt Time Interval As shown in equation (1), the [X] (square bracket) is an integer function which is the largest whole number smaller than or equal to the number in the brackets (i.e., [X]=greatest integer≦X).

In an embodiment, the Takt Time Ratio $TTR_1$ is an average of a ratio type of all the items in sequence of tasks 210a, that is, in this exemplary production schedule 200, items A, B, and C. In addition, Takt Time Ratio $TTR_1$ includes a numerator of a Takt time interval $T_i$ and a denominator of a weighted average $M_i$ of the number of tasks in item type i subsequences having $\geq T_i$ tasks, where i varies over all the item types of A-N. In addition, or as an alternative, Takt time interval $T_i$ is a ratio where numerator D is the total number of tasks in sequence of tasks 210a and denominator $D_i$ is the number of tasks of a particular item type (i.e., item types A, B, and C).

In one embodiment, the Takt time interval $T_i$ is an objective (i.e., a goal of the one or more rules for the size of the subsequence). For example, in a perfectly level sequence of tasks, each subsequence of item type A should be of a duration $T_A$, each subsequence of item type B should be of a duration $T_B$, each subsequence of type C should be of a duration $T_C$, and so on. In addition, or as an alternative, weighted average $M_A$ is a weighted average of the number tasks in item type A subsequences that have more than $T_A$ tasks. If the number of tasks in each subsequence has more $T_A$ tasks in it, then one or more planners 110 counts that sequence that many times in the weighted average $M_A$. In essence, this provides one or more planners 110 a mechanism of measuring the larger subsequences in an unleveled schedule.

In addition, or as an alternative, Takt Time Ratio $TTR_2$ is the smallest of a number of terms for each item i, or for all items A-N, upper bounded by unity. This is the same ratio as in the Takt Time Ratio $TTR_1$, except that the ratio includes an adjusted Takt time interval $T'_A$ which provides an adjustment in the calculation. As illustrated in equation (1) the Takt Time Ratio $TTR_2$ is multiplied by 9, which provides the bulk of the score and Takt Time Ratio $TTR_1$ provides a fine tuning measure, which is added to Takt Time Ratio $TTR_2$.

To further explain the operation of optimizing the sequence of tasks in production schedule 200 to a state of levelness, an example is now given. In the following example, and as discussed above, sequence of tasks 210a represents a total demand D of 10 tasks that is a total demand $D_A$ of 5 tasks to produce item A, a total demand $D_B$ of 3 tasks to produce item B, and a total demand $D_C$ of 2 tasks to produce item C. Although a particular sequence of tasks 210a is shown and described, embodiments contemplate any suitable sequence of tasks, without departing from the scope or principles of the present invention. Based on equation (1), one or more planners 110 determines the Takt time interval $T_A$ for each of items A, B, and C to be $T_A$=2, $T_B$=3.33, and $T_C$=5. Therefore, in a perfectly level sequence of tasks 210a, item A would need to be produced every 2 tasks, item B would need to be produced every 4 tasks, and item C would need to be produced every 5 tasks. Put another way, in any set of 2 tasks in sequence of tasks 210a, there needs to be an item type A in order to get all item A's produced in, and spread out properly in a perfectly level sequence of tasks.

Continuing with this example and based on the order of tasks in sequence of tasks 210a one or more planners 110 determines the number of subsequences composed of [X] tasks where $X \geq [T_A]$ and calculates the weighted average $M_i$ for each of items A, B, and C in sequence of tasks 210a. That is, as shown in the first sequence of tasks of sequence of tasks 210a there is only one item A subsequence with at least 2 tasks which includes a subsequence of 6 tasks, denoted as 6A's. Therefore, the weight on item A subsequence of 6 tasks is 5 (1+|$T_A$–X| or 1+|2–6|) and the weighted average $M_A$ for item A is 6 ((5×6)/(5×1)). In addition, as shown in the first sequence of tasks of sequence of tasks 210a there is only one item B subsequence with at least [3.33]=3 tasks which includes a subsequence of 8 tasks, denoted as 8B's. Therefore, the weight on item B subsequence of 8 tasks is 6 (1+|$T_B$–X| or 1+|3–8|) and the weighted average $M_B$ for item B is 8 ((6×8)/(6×1)). Furthermore, as shown in the first sequence of tasks of sequence of tasks 210a there is only one item C subsequence with at least 5 tasks which includes a subsequence of 9 tasks, denoted as 9C's. Therefore, the weight on item C subsequence is 5 (1+|$T_C$–X| or 1+|5–9|) and the weighted average $M_C$ for item C is 9 ((5×9)/(5×1)).

Next, one or more planners calculate the Takt time ratio $TTR_1$ which, as shown in Equation (1) is the average of the Takt time interval $T_A$ and the weighted average $M_A$. Based on the above calculated Takt time interval $T_A$ and the weighted average $M_A$ for items A, B, and C, the Takt time ratio $TTR_1$ of the first sequence of tasks of sequence of tasks 210a is 0.44, which is the average of {2/6, 3.33/8, 5/9}. Next one or more planners 110 calculates the adjusted Takt time ratio $TTR_2$ of sequence of tasks 210a as 0.5, which is the Min(1, [$T_i$+1]/$M_i$) over all i in {A, B, C} which is the minimum of {1, 3/6, 4/8, 6/9}. One or more planners 110 then calculates the Takt time ratio TTR of the first sequence of tasks of sequence of tasks 210a as 4.44, which, as shown in Equation (1) is $TTR_1$+[9×$TTR_2$] (0.44+[9×0.5]=4.44).

As discussed below in more detail, one or more planners 110 optimizes production schedule 200 to a state of levelness by, for example, adjusting the order of the tasks by spreading the tasks associated with each item, until a level sequence of tasks is achieved. In addition, each time a new sequence of tasks is adjusted one or more planners 110 calculates the Takt time ratio TTR of sequence of tasks 210a and adjusts the order of the tasks until a level sequence of tasks is achieved.

Continuing with this example, and with reference to the Nth sequence of tasks of sequence of tasks 210a the Takt time interval $T_A$ remains the same as determined above, however, the weighted averages $M_i$ changes because the tasks are spread out into additional subsequences. In one embodiment, one or more planners 110 determine the number of subsequences with at least X tasks and calculates the weighted average $M_i$ for each of items A, B, and C in the Nth sequence of tasks of sequence of tasks 210a. That is, as shown in the Nth sequence of tasks of sequence of tasks 210a there are now four item A subsequences with at least 2 tasks which includes three subsequences of 2 tasks and one subsequence of 3 tasks, denoted as 2A's and 3A's. Therefore, since there is more than one subsequence with different numbers of tasks in each subsequence, the weighted averages are calculated for each subsequence including the different number of tasks. The weight on item A subsequence of 2 tasks is 1 (1+|$T_A$–X| or 1+|2–2|) and the weight on item A subsequence of 3 tasks is 2 (1+|$T_A$–X| or 1+|2–3|). The weighted average $M_A$ for item A is 2.44, the average of {2, 2, 2, 3, 3}.

In addition, as shown in the Nth sequence of tasks of sequence of tasks 210a there are now two item B subsequences with at least [3.33]=3 tasks which includes two subsequences of 4 tasks, (note that there is one subsequence with 2 tasks, however, this is not used in the calculation, since 2 tasks is not greater than or equal to 3 tasks). Therefore, the weight on item B subsequence of 4 tasks is 1 (1+|$T_B$–X| or 1+|3.33–4|) or 1+|–0.67|]=1+0=1) and the weighted average $M_B$ for item B is 4, the average of {4, 4}. Furthermore, as shown in the Nth sequence of tasks of sequence of tasks 210a there are now two subsequences with at least 5 tasks which includes two subsequences of 5 tasks. Therefore, the weight on item C subsequence of 5 tasks is 1 (1+|$T_C$–X| or 1+|5–5|) and the weighted average $M_C$ for item C is 5, the average of {5, 5}.

Next, one or more planners calculates Takt time ratio $TTR_1$ based on the above calculated Takt time interval $T_A$ and the weighted average $M_A$ for items A, B, and C, the Takt time ratio $TTR_1$ of the Nth sequence of tasks of sequence of tasks 210a is 0.89, which is the average of {2/2.4, 3.33/4, 5/5}. Next one or more planners 110 calculates the adjusted Takt time ratio $TTR_2$ as 1, which is the Min(1, [$T_i$+1]/$M_i$) over all i in {A, B, C}, which is the minimum of {1, 3/2.4, 4/4, 6/5}. One or more planners 110 then calculates the Takt time ratio TTR of the Nth sequence of tasks of sequence of tasks 210a as 9.89, which, as shown in Equation (1) is $TTR_1$+[9×$TTR_2$].

As shown above, embodiments provide for optimizing production schedule 200 to a state of levelness, that is embodiments provide for spreading out the tasks in the first sequence of tasks of sequence of tasks 210a and adjusting the order of the tasks by spreading the tasks associated with each item, until a Nth sequence of tasks of sequence of tasks 210a is achieved with acceptable levelness (i.e., the sequence having a predetermined Takt time ratio TTR, such as, for example, the highest calculated Takt time ratio TTR).

Figure 3:
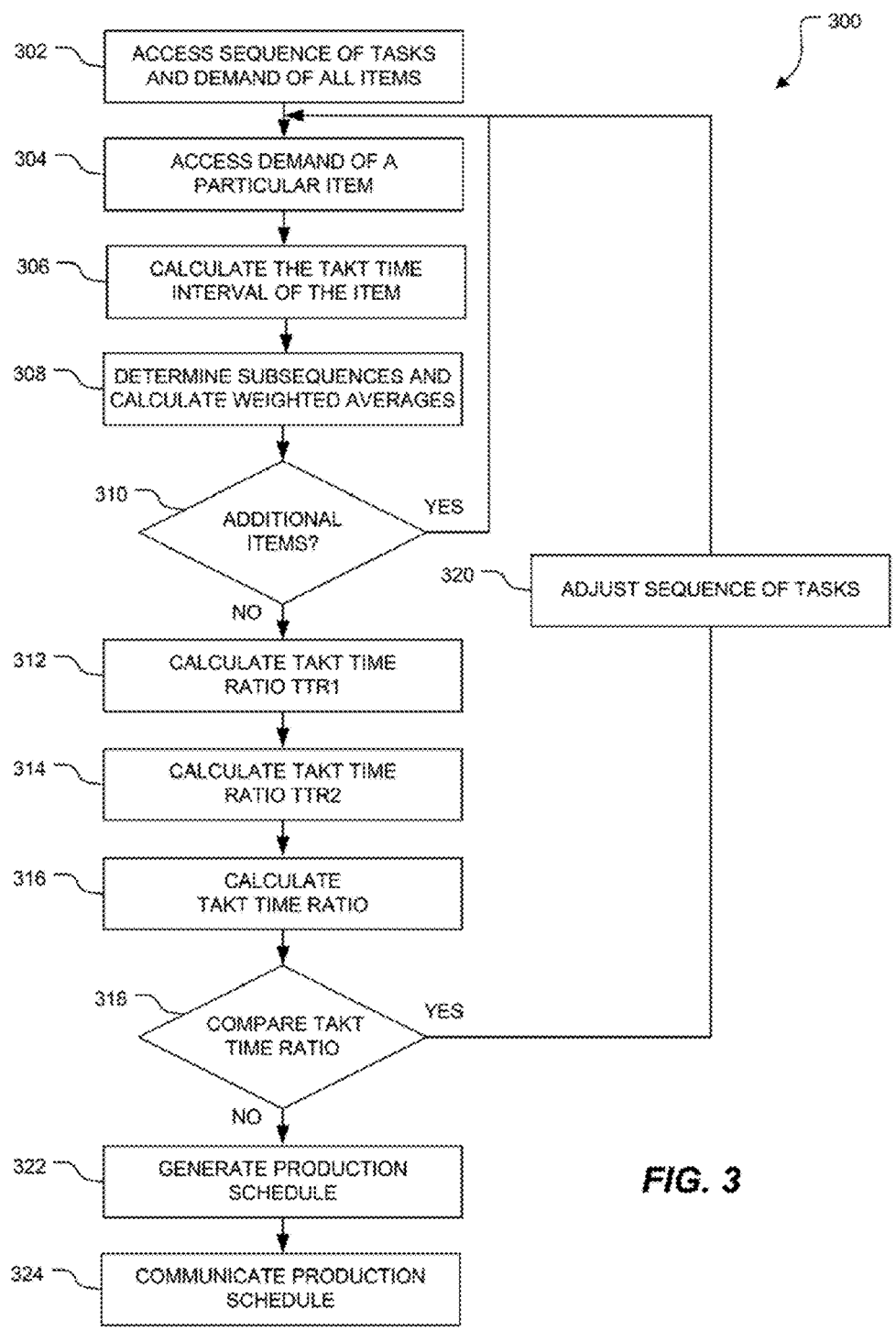
FIG. 3 illustrates an exemplary method of generating a production schedule in the exemplary system.

FIG. 3 illustrates an exemplary method 300 of generating a production schedule in system 100. One or more planners 110 begins the method at step 302 by accessing a sequence of tasks and the total demand of all items to be processed in the sequence of tasks from one or more entities 120a-120n. At step 304, one or more planners 110 accesses the demand of a particular item to be processed in the sequence of tasks from the one or more entities 120a-120n. As discussed above, the demand of the particular item is represented as the number of particular item tasks in the sequence of tasks. In addition, as discussed in more detail below, steps 304-308 are repeated for each additional item to be processed in the sequence of tasks.

At step 306, one or more planners 110 calculates the Takt time interval $T_A$ of the particular item to be processed in the sequence of tasks based on the total demand (i.e., the total number of tasks in the sequence of tasks accessed in step 302) and the demand for the particular item (i.e. the total number of tasks for the particular item in the sequence of tasks accessed in step 304). At step 308, one or more planners 110 determines the number of subsequences with $X \geq [T_i]$ tasks and calculates the particular items weighted average Mi of the number of tasks in the particular items subsequences having $\geq[T_i]$ tasks. One or more planners 110 calculates for each subsequence, the weight on each subsequence of X tasks=1+ $[|T_A-X|]$. That is, the weight of each subsequence of tasks determines how many times the number of tasks in the subsequence is used in the calculation of the weighted average $M_i$. One or more planners 110 then calculates the weighted average of the subsequence(s) of tasks. As an example only, and not by way of limitation, if the weight is 1 then one or more planners 110 counts the number of tasks in the subsequence once in the calculation of the weighted average $M_i$, if the weight is 2, then one or more planners 110 counts the number of tasks in the subsequence twice in the calculation of the weighted average $M_i$, and so on.

At step 310, one or more planners 110 determines whether there is another item to be processed in the sequence of tasks based on the sequence of tasks accessed in step 302. If there is another item, the method returns to step 304 to access the demand of the additional item, calculate the Takt time interval $T_A$ of the additional item to be processed, and calculate the additional item's weighted average Mi of the number of tasks in the additional items subsequences, otherwise, the method proceeds to step 312.

At step 312, one or more planners 110 calculates the Takt time ratio $TTR_1$ which is the average of the ratios of the Takt time interval and the weighted average (Ti/Mi). At step 314, one or more planners 110 calculates the Takt time ratio $TTR_2$ which is the adjusted Takt time interval (i.e., $TTR_2=Min(1, T'_i/M_i)$ for all items i). At step 316, one or more planners 110 calculates the Takt time ratio based on the calculated Takt time ratio $TTR_1$ and the adjusted Takt time ratio $TTR_2$ and stores the Takt time ratio TTR in database 118.

At step 318, one or more planners 110 compares the calculated Takt time ratio TTR from step 316 with previous stored Takt time ratio TTR in database 118 and determines if additional optimization is required. If additional optimization is required, the method proceeds to step 320, otherwise, the method proceeds to step 322. At step 320, one or more planners 110 adjusts the order of the tasks by spreading the tasks associated with each item in the sequence of tasks, thereby creating a new sequence of tasks. The method then returns to step 302 to repeat for the new sequence of tasks steps 302-318.

At step 322, one or more planners 110 generates a production schedule based on a sequence of tasks having a predetermined calculated Takt time ratio TTR, such as, for example, a highest calculated Takt time ratio TTR and stores the generated production schedule in database 118. At step 324, one or more planners 110 communicates the generated production schedule to one or more entities 120a-120n and the method ends. In addition, although, FIG. 3 illustrates one embodiment of a method of generating a production schedule in system 100, various changes may be made to method 300 without departing from the scope of embodiments of the present invention.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system providing levelness of a production schedule, comprising:
    a database that stores demand data of one or more items to be processed within a sequence of tasks; and
    a computer coupled with the database and configured to:
        access the demand data of the one or more items;
        calculate one or more time intervals for each of the one or more items;
        calculate a weighted average for each of the one or more items;
        calculate a time ratio according to the sequence of tasks by:
            calculating the average of the calculated time intervals and the calculated weighted averages; and
            calculating a minimum ratio of an adjusted time interval for each of the one or more items and the calculated weighted averages, upper bounded by unity;
        generate a production schedule based on a sequence of tasks having a predetermined calculated time ratio; and
        store the generated production schedule in the database.

2. The system of claim 1, wherein the computer is further configured to:
    determine a total number of tasks within the sequence of tasks and a total number of tasks for each of the one or more items based on the accessed demand data of the one or more items.

3. The system of claim 2, wherein the one or more time intervals is determined by calculating the ratio of the total number of tasks within the sequence of tasks and the total number of tasks for each of the one or more items.

4. The system of claim 1, wherein the computer is further configured to:
    determine a number of subsequences of tasks within the sequence of tasks for each of the one or more items which have at least $[T_A]$ tasks, where $[T_A]$ is the largest whole number smaller than or equal to the time interval of the item.

5. The system of claim 4, wherein the computer is further configured to:
    for each of the subsequence of tasks within the sequence of tasks calculate a weight of each of the one or more items based on:

$1+[|T_A-X|]$ wherein $T_A$ is representative of the time interval for each of the one or more items and X is representative of the number of tasks within the subsequence of tasks.

6. The system of claim 5, wherein the computer is further configured to:
    calculate a weighted average for each of the one or more items in accordance with the determined number of tasks within the subsequence of tasks and the calculated weight of each of the one or more items.

7. The system of claim 1, wherein the computer is further configured to determine a new order of tasks within the sequence of tasks.

8. A computer-implemented method of providing levelness of a production schedule, comprising:
    accessing, by a computer, demand data of one or more items to be processed within a sequence of tasks;
    calculating, by the computer, one or more time intervals for each of the one or more items;

calculating, by the computer, a weighted average for each of the one or more items;

calculating, by the computer, a time ratio according to the sequence of tasks by:
  calculating the average of the calculated time intervals and the calculated weighted averages; and
  calculating a minimum ratio of an adjusted time interval for each of the one or more items and the calculated weighted averages, upper bounded by unity;

generating, by the computer, a production schedule based on a sequence of tasks having a predetermined calculated time ratio; and storing, by the computer, the generated production schedule in the database.

9. The method of claim 8, further comprising:
determining a total number of tasks within the sequence of tasks and a total number of tasks for each of the one or more items based on the accessed demand data of the one or more items.

10. The method of claim 9, wherein the one or more time intervals is determined by calculating the ratio of the total number of tasks within the sequence of tasks and the total number of tasks for each of the one or more items.

11. The method of claim 8, further comprising:
determining a number of subsequences of tasks within the sequence of tasks for each of the one or more items which have at least $[T_A]$ tasks, where $[T_A]$ is the largest whole number smaller than or equal to the time interval of the item.

12. The method of claim 11, further comprising:
for each of the subsequences of tasks within the sequence of tasks calculating a weight of each of the one or more items based on:

$$1+[|T_A-X|]$$

wherein $T_A$ is representative of the time interval for each of the one or more items and X is representative of the number of tasks within the subsequence of tasks.

13. The method of claim 12, further comprising:
calculating a weighted average for each of the one or more items in accordance with the determined number of tasks within the subsequence of tasks and the calculated weight of each of the one or more items.

14. The method of claim 8, further comprising:
determining a new order of tasks within the sequence of tasks.

15. A computer-readable medium embodied with software providing levelness of a production schedule, the software when executed using one or more computers is configured to:
access demand data of one or more items to be processed within a sequence of tasks;
calculate one or more time intervals for each of the one or more items;
calculate a weighted average for each of the one or more items;
calculate a time ratio according to the sequence of tasks by:
  calculating the average of the calculated time intervals and the calculated weighted averages; and
  calculating a minimum ratio of an adjusted time interval for each of the one or more items and the calculated weighted averages, upper bounded by unity;
generate a production schedule based on a sequence of tasks having a predetermined calculated time ratio; and
store the generated production schedule in the database.

16. The computer-readable medium of claim 15, wherein the software is further configured to:
determine a total number of tasks within the sequence of tasks and a total number of tasks for each of the one or more items based on the accessed demand data of the one or more items.

17. The computer-readable medium of claim 16, wherein the one or more time intervals is determined by calculating the ratio of the total number of tasks within the sequence of tasks and the total number of tasks for each of the one or more items.

18. The computer-readable medium of claim 15, wherein the software is further configured to:
determine a number of subsequences of tasks within the sequence of tasks for each of the one or more items which have at least $[T_A]$ tasks, where $[T_A]$ is the largest whole number smaller than or equal to the time interval of the item.

19. The computer-readable medium of claim 18, wherein the software is further configured to:
for each of the subsequence of tasks within the sequence of tasks calculate a weight of each of the one or more items based on:

$$1+[|T_A-X|]$$

wherein $T_A$ is representative of the time interval for each of the one or more items and X is representative of the number of tasks within the subsequence of tasks.

20. The computer-readable medium of claim 19, wherein the software is further configured to:
calculate a weighted average for each of the one or more items in accordance with the determined number of tasks within the subsequence of tasks and the calculated weight of each of the one or more items.

21. The computer-readable medium of claim 15, wherein the software is further configured to:
determine a new order of tasks within the sequence of tasks.

* * * * *